United States Patent
Choi et al.

(10) Patent No.: US 11,396,582 B2
(45) Date of Patent: Jul. 26, 2022

(54) POLYAMIC ACID, POLYIMIDE FILM AND FABRICATION METHOD OF THE POLYIMIDE FILM

(71) Applicants: Samsung Display Co., Ltd., Yongin-si (KR); University-Industry Cooperation Group of Kyung Hee University, Yongin-si (KR)

(72) Inventors: Chaungi Choi, Suwon-si (KR); Sang-hyon Paek, Seongnam-si (KR); Seulgi Kim, Suwon-si (KR); Jangju Lee, Hwaseong-si (KR)

(73) Assignees: Samsung Display Co., Ltd., Yongin-si (KR); University-Industry Cooperation Group of Kyung Hee University, Yongin-si (KR)

(*) Notice: Subject to any disclaimer, the term of this patent is extended or adjusted under 35 U.S.C. 154(b) by 0 days.

(21) Appl. No.: 16/854,625

(22) Filed: Apr. 21, 2020

(65) Prior Publication Data

US 2020/0247955 A1    Aug. 6, 2020

Related U.S. Application Data

(62) Division of application No. 15/798,054, filed on Oct. 30, 2017, now abandoned.

(30) Foreign Application Priority Data

Feb. 10, 2017    (KR) .................. 10-2017-0018866

(51) Int. Cl.
  *C08G 73/10* (2006.01)
  *C08J 5/18* (2006.01)

(52) U.S. Cl.
  CPC ..... *C08G 73/1067* (2013.01); *C08G 73/1042* (2013.01); *C08G 73/1057* (2013.01); *C08J 5/18* (2013.01); *C08J 2379/08* (2013.01)

(58) Field of Classification Search
  CPC . C08G 73/1067; C08G 73/1042; C08L 79/08; C08J 2379/08
  See application file for complete search history.

(56) References Cited

U.S. PATENT DOCUMENTS

| | | |
|---|---|---|
| 4,378,400 A | 3/1983 | Makino et al. |
| 6,627,377 B1 | 9/2003 | Itatani et al. |
| 7,026,080 B2 | 4/2006 | Nakayama et al. |
| 9,278,488 B2 | 3/2016 | Park et al. |
| 2009/0226642 A1 | 9/2009 | Simone et al. |
| 2011/0082276 A1* | 4/2011 | Park .................. C08G 73/1032 528/335 |
| 2013/0035447 A1* | 2/2013 | Jeong ................. C08G 73/1067 525/436 |
| 2014/0364564 A1 | 12/2014 | Hong et al. |
| 2015/0011726 A1 | 1/2015 | Hasegawa et al. |
| 2016/0214067 A1* | 7/2016 | Miller .................. B01D 53/228 |
| 2017/0096530 A1 | 4/2017 | Yun et al. |

FOREIGN PATENT DOCUMENTS

| | | |
|---|---|---|
| CN | 103930489 A | 7/2014 |
| EP | 1024407 A1 | 8/2000 |
| JP | 2010266868 A | 11/2010 |
| JP | 2013-164432 | 8/2013 |
| JP | 2016-222798 A | 12/2016 |
| JP | 2016222797 A | 12/2016 |
| KR | 10-2007-0102053 A | 10/2007 |
| KR | 10-2015-0095980 A | 8/2015 |
| KR | 10-2016-0002386 A | 1/2016 |
| KR | 10-1646283 B1 | 8/2016 |
| KR | 10-2016-0105378 A | 9/2016 |
| KR | 10-2016-0108252 A | 9/2016 |
| TW | I306881 B | 3/2009 |
| WO | 2013121917 A1 | 8/2013 |

OTHER PUBLICATIONS

Schab-Balcerzak et al (New polyimides as precursors for functionalized polymers, High Perform. Polym.13 (2001) 35-44, published on Feb. 2001.*
Bell et al "Polyimide Structure-Property Relationships. II.Polymers from Isomeric Diamines", Journal of Polymer Science, Polymer Chemistry Edition vol. 14, 2275-2292 (1976), published on Dec. 1976.*
Kwon, Se Jin, et al., "Preparation and Characterization of Transparent Polyimide/Silica Composite Films by a Sol-Gel Reaction," Molecular Crystals and Liquid Crystals, vol. 584, 2013, 10 pages.
EPO Extended Search Report dated Jul. 20, 2018, for corresponding European Patent Application No. 17202552.0 (9 pages).

* cited by examiner

*Primary Examiner* — Gregory Listvoyb
(74) *Attorney, Agent, or Firm* — Lewis Roca Rothgerber Christie LLP

(57) ABSTRACT

A polyamic acid according to an embodiment is formed by a polymerization reaction of a dianhydride compound, a first diamine compound represented by the following Formula 1, and a second diamine compound, which is different from the first diamine compound. A polyimide film derived from the polyamic acid may exhibit excellent heat resistance and improved optical properties:

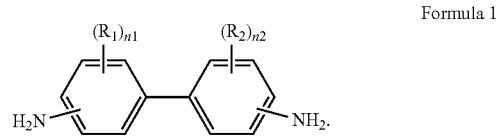

Formula 1

10 Claims, 2 Drawing Sheets

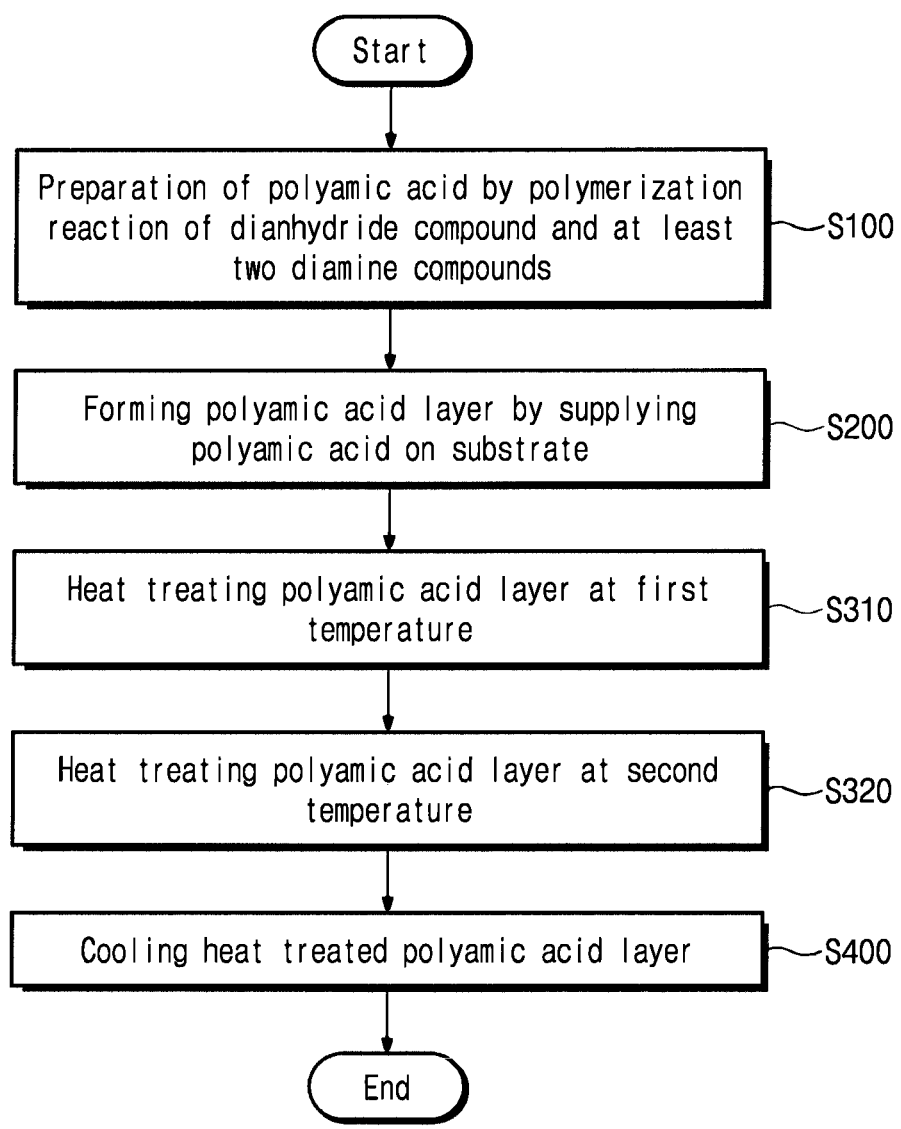

POLYAMIC ACID, POLYIMIDE FILM AND FABRICATION METHOD OF THE POLYIMIDE FILM

CROSS-REFERENCE TO RELATED APPLICATION

This patent application is a divisional of U.S. patent application Ser. No. 15/798,054, filed on Oct. 30, 2017, which claims priority to and the benefit of Korean Patent Application No. 10-2017-0018866, filed on Feb. 10, 2017, the entire content of which is hereby incorporated by reference.

BACKGROUND

One or more aspects of embodiments of the present disclosure herein relate to a polyamic acid, a polyimide film formed using the same, and a fabrication method of the polyimide film, and more particularly, to a polyamic acid utilized for attaining a polyimide film having excellent optical properties and heat resistance and a fabrication method of the polyimide film.

Polyimide is a polymer material capable of having excellent heat resistance and chemical resistance and exhibiting good mechanical properties, and may be used (utilized) in various industrial fields. For example, polyimide has been developed as an alignment material of a liquid crystal display, an insulating material, and/or a material for a flexible substrate, and it may be utilized for diverse applications in a display apparatus.

Recently, in order to use a polyimide film as a replacement of a glass substrate in a flexible display apparatus, a portable display apparatus, etc., developments on improving the optical properties and heat resistance of the polyimide film are being conducted.

SUMMARY

One or more aspects of embodiments of the present disclosure are directed toward a polyamic acid for obtaining a polyimide that maintains optical properties of high transparency and has high dimensional stability and heat resistance, a polyimide film formed using the polyamic acid, and a fabrication method of the polyimide film.

An embodiment of the inventive concept provides a polyamic acid being a polymerization product of a dianhydride compound, a first diamine compound represented by the following Formula 1, and a second diamine compound different from the first diamine compound:

Formula 1

$H_2N$—[phenyl($R_1)_{n1}$]—[phenyl($R_2)_{n2}$]—$NH_2$, wherein in Formula 1, $R_1$ and $R_2$ may each independently be a hydrogen atom, a deuterium atom, a halogen atom, or a substituted or unsubstituted alkyl group of 1 to 20 carbon atoms, and $n_1$ and $n_2$ may each independently be an integer of 0 to 4.

In an embodiment, the second diamine compound may be represented by the following Formula 2:

Formula 2

$H_2N$—Ar($(COOH)_m$)—$NH_2$, wherein in Formula 2, Ar may be a substituted or unsubstituted phenyl group, and m may be an integer of 1 to 4. In an embodiment, the second diamine compound may be represented by the following Formula 2-1:

Formula 2-1

$H_2N$—[phenyl-COOH]—$NH_2$.

In an embodiment, in Formula 1, $n_1$ and $n_2$ may be each independently an integer of 1 or more, and $R_1$ and $R_2$ may each independently be an alkyl group of 1 to 20 carbon atoms substituted with at least one fluorine atom.

In an embodiment, the first diamine compound of Formula 1 may be represented by the following Formula 1-1:

Formula 1-1

$H_2N$—[phenyl($R_1)_{n1}$]—[phenyl($R_2)_{n2}$]—$NH_2$, wherein $R_1$, $R_2$, $n_1$ and $n_2$ are the same as defined above.

In an embodiment, the first diamine compound of Formula 1 may be represented by the following Formula 1-2:

Formula 1-2

$H_2N$—[phenyl-$CF_3$]—[phenyl-$CF_3$]—$NH_2$.

In an embodiment, a molar ratio of a sum of the first diamine compound and the second diamine compound with respect to the dianhydride compound may be from about 1:0.9 to about 1:1.1.

In an embodiment, a molar ratio of the first diamine compound to the second diamine compound may be from about 0.01:0.99 to about 0.99:0.01.

In an embodiment, the dianhydride compound may include at least one selected from 4,4'-(hexafluoroisopropylidene)diphthalic anhydride, 3,3',4,4'-biphenyltetracarboxylic dianhydride, cyclobutane-1,2,3,4-tetracarboxyl dianhydride and pyromellitic dianhydride.

In an embodiment, the dianhydride compound may be 3,3',4,4'-biphenyltetracarboxylic dianhydride, the first diamine compound may be 2,2'-bis(trifluoromethyl)benzidine, and the second diamine compound may be 3,5-diaminobenzoic acid.

In an embodiment, the polyamic acid may include a repeating unit represented by the following Formula 3:

Formula 3

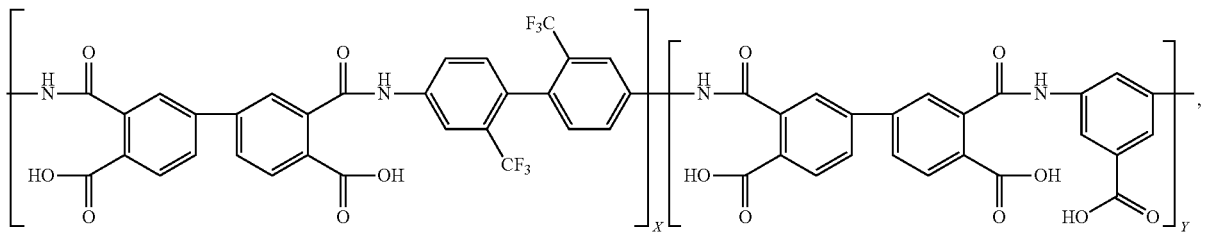

wherein, in Formula 3, X and Y may each independently be an integer of 1 or more.

In an embodiment of the inventive concept, there is provided a polyimide film including a repeating unit derived from the polyamic acid according to the above-described embodiment.

In an embodiment, a thermal expansion coefficient of the polyimide film may be from about 10 ppm/° C. to about 20 ppm/° C.

In an embodiment, a glass transition temperature of the polyimide film may be from about 300° C. to about 420° C.

In an embodiment, a thermal decomposition temperature of the polyimide film may be from about 400° C. to about 500° C., where the thermal decomposition temperature may refer to a temperature at which a weight reduction ratio of the polyimide film reaches about 1%.

In an embodiment, a light transmittance of the polyimide film may be about 95% or more.

In an embodiment, a yellow index of the polyimide film may be from about 1 to about 10.

In an embodiment, the polyimide film may have a light transmittance of about 95% or more, a thermal expansion coefficient of about 10 ppm/° C. to about 20 ppm/° C., and a glass transition temperature of about 300° C. to about 420° C.

In an embodiment, the polyimide film may include a repeating unit represented by the following Formula 4:

In an embodiment, the preparing of the polyamic acid may be performed at a temperature range of about −10° C. to about 80° C.

In an embodiment, the heat treating of the polyamic acid layer may include heat treating at a temperature range of about 250° C. to about 550° C.

In an embodiment, the fabrication method of a polyimide film may further include cooling after the heat treating of the polyamic acid layer.

In an embodiment, the heat treating of the polyamic acid layer may include first heat treating at a first temperature, and second heat treating at a second temperature higher than the first temperature.

In an embodiment, the first temperature may be from about 250° C. to less than about 300° C., and the second temperature may be from about 300° C. to about 550° C.

In an embodiment, the heat treating of the polyamic acid layer may be conducted in a vacuum state.

BRIEF DESCRIPTION OF THE FIGURES

The accompanying drawings are included to provide a further understanding of the inventive concept, and are incorporated in and constitute a part of this specification. The drawings illustrate example embodiments of the inventive concept and, together with the description, serve to explain principles of the inventive concept. In the drawings:

Formula 4

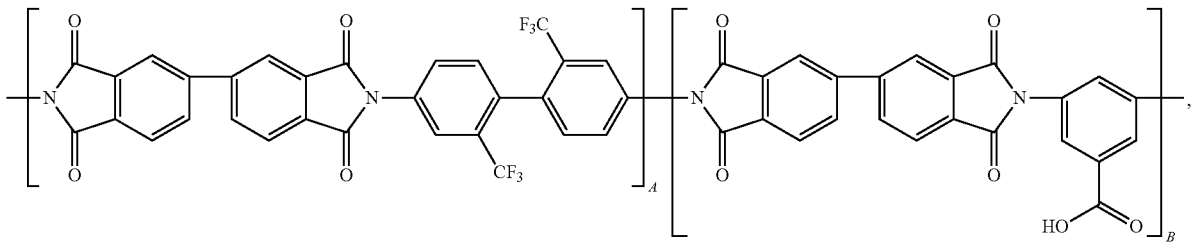

Figure 1:
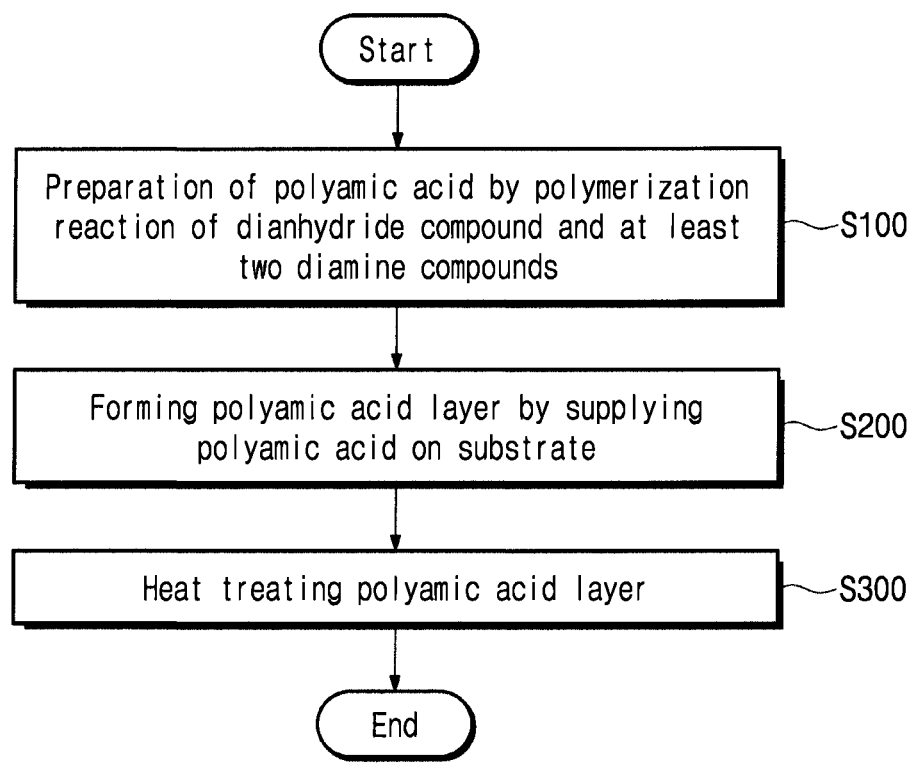

wherein, in Formula 4, A and B are each independently an integer of 1 or more.

In an embodiment of the inventive concept, there is provided a fabrication method of a polyimide film, the method including preparing a polyamic acid according to the above-described embodiment by a polymerization reaction of a dianhydride compound and at least two kinds of diamine compounds, providing the polyamic acid on a substrate to form a polyamic acid layer, and heat treating the polyamic acid layer.

FIG. 1 is a flowchart showing a fabrication method of a polyimide film according to an embodiment; and FIG. 2 is a flowchart showing a fabrication method of a polyimide film according to an embodiment.

DETAILED DESCRIPTION

The inventive concept may be embodied in different forms and may have various modifications, and example embodiments of the inventive concept will be described below in more detail with reference to the accompanying drawings. The inventive concept, however, should not be construed as limited to the embodiments set forth herein. Rather, these embodiments should be understood to include modifications, equivalents, or substitutes within the spirit and scope of the inventive concept.

In the drawings, like reference numerals refer to like elements throughout. The dimensions of structures may be exaggerated for clarity of illustration. It will be understood that, although the terms first, second, etc. may be used herein to describe various elements, these elements should not be limited by these terms. These terms are only used to distinguish one element from another element. For example, a first element could be termed a second element without departing from the teachings of the present invention. Similarly, a second element could be termed a first element. As used herein, the singular forms are intended to include the plural forms as well, unless the context clearly indicates otherwise.

It will be further understood that the terms "comprises" or "comprising," when used in this specification, specify the presence of stated features, numerals, tasks, operations, elements, parts, or the combination thereof, but do not preclude the presence or addition of one or more other features, numerals, tasks, operations, elements, parts, or the combination thereof. It will also be understood that when a layer, a film, a region, a plate, etc. is referred to as being 'on' another part, it can be directly on the other part, or intervening layers may also be present.

Hereinafter, a polyamic acid according to an embodiment will be explained in more detail.

The polyamic acid according to an embodiment may be formed by including a dianhydride compound and at least two kinds of diamine compounds. The polyamic acid according to an embodiment may be a polymerization product obtained by the polymerization reaction of a dianhydride compound, a first diamine compound represented by the following Formula 1, and a second diamine compound, which is different from the first diamine compound.

The first diamine compound may be represented by the following Formula 1:

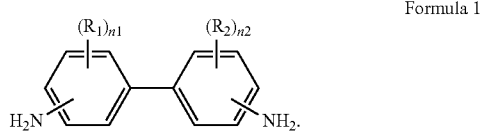

Formula 1

In Formula 1, $R_1$ and $R_2$ may be each independently a hydrogen atom, a deuterium atom, a halogen atom, or a substituted or unsubstituted alkyl group of 1 to 20 carbon atoms. In addition, $n_1$ and $n_2$ may be each independently an integer of 0 to 4.

In Formula 1, $R_1$ and $R_2$ may be the same or different from each other. In addition, $n_1$ and $n_2$ may be the same or different from each other.

In some embodiments, in the first diamine compound represented by Formula 1, $n_1$ and $n_2$ may be each independently an integer of 1 or more. For example, $n_1$ and $n_2$ may be the same integer of 1 or more. In some embodiments, $n_1$ and $n_2$ may be different from each other (e.g., $n_1$ and $n_2$ may be different integers of 1 or more). For example, both $n_1$ and $n_2$ may be 1. In another example, one of $n_1$ and $n_2$ may be 0, and the remaining one of $n_1$ and $n_2$ may be an integer of 1 or more.

When $n_1$ and $n_2$ are each independently an integer of 2 or more, a plurality of $R_1$ may be the same or different from each other, and a plurality of $R_2$ may be the same or different from each other.

In an embodiment, in the case where $n_1$ and $n_2$ are each independently an integer of 1 or more, $R_1$ and $R_2$ of the first diamine compound represented by Formula 1 may be each independently an alkyl group of 1 to 20 carbon atoms substituted with at least one fluorine atom. In embodiments where $n_1$ is an integer of 2 or more, at least one $R_1$ may be an alkyl group of 1 to 20 carbon atoms substituted with at least one fluorine atom, or two or more $R_1$ may be alkyl groups of 1 to 20 carbon atoms substituted with at least one fluorine atom. In embodiments where $n_2$ is an integer of 2 or more, at least one $R_2$ may be an alkyl group of 1 to 20 carbon atoms substituted with at least one fluorine atom, or two or more $R_2$ may be alkyl groups of 1 to 20 carbon atoms substituted with at least one fluorine atom.

$R_1$ and $R_2$ may each independently be a hydrogen atom, a deuterium atom, a halogen atom, an unsubstituted alkyl group of 1 to 20 carbon atoms, or a substituted alkyl group of 1 to 20 carbon atoms. For example, $R_1$ and $R_2$ may be each independently an alkyl group of 1 to 20 carbon atoms substituted with at least one fluorine atom. For example, $R_1$ and $R_2$ may be represented by *—$CF_3$, *—$CF_2CF_3$, *—$CH_2CF_3$, *—$CH_2CF_2CF_3$, and/or *—$CF_2CF_2CF_3$. However, an embodiment of the inventive concept is not limited thereto.

For example, in the first diamine compound represented by Formula 1 for forming the polyamic acid according to an embodiment, both $n_1$ and $n_2$ may be 1, and both $R_1$ and $R_2$ may be trifluoromethyl. Heat resistance may be improved by using the first diamine compound represented by Formula 1, in which at least one of $R_1$ and $R_2$ is an alkyl group of 1 to 20 carbon atoms substituted with at least one fluorine atom, when forming the polyamic acid according to an embodiment.

As used in the present disclosure, the term "substituted or unsubstituted" may refer to the corresponding group being either unsubstituted or substituted with at least one substituent selected from a deuterium atom, a halogen atom, a cyano group, a nitrile group, a nitro group, an amino group, a silyl group, a boron group, a phosphine oxide group, an alkyl group, an alkenyl group, a fluorenyl group, an aryl group and a heteroaryl group. In addition, each of the substituent groups above may be substituted or unsubstituted. For example, a biphenyl group may be described as an aryl group, or as a phenyl group substituted with a phenyl group.

In the present disclosure, examples of the halogen atom may include a fluorine atom, a chlorine atom, a bromine atom, and an iodine atom.

In the present disclosure, the alkyl group may refer to a carbohydrate group having a linear or branched chain or a cyclic shape. Non-limiting examples of the alkyl group may include methyl, ethyl, n-propyl, isopropyl, n-butyl, s-butyl, t-butyl, i-butyl, 2-ethylbutyl, 3,3-dimethylbutyl, n-pentyl, i-pentyl, neopentyl, t-pentyl, cyclopentyl, 1-methylpentyl, 3-methylpentyl, 2-ethylpentyl, 4-methyl-2-pentyl, n-hexyl, 1-methylhexyl, 2-ethylhexyl, 2-butylhexyl, cyclohexyl, 4-methylcyclohexyl, 4-t-butylcyclohexyl, n-heptyl, 1-methylheptyl, 2,2-dimethylheptyl, 2-ethylheptyl, 2-butylheptyl, n-octyl, t-octyl, 2-ethyloctyl, 2-butyloctyl, 2-hexyloctyl, 3,7-dimethyloctyl, cyclooctyl, n-nonyl, n-decyl, adamantyl, 2-ethyldecyl, 2-butyldecyl, 2-hexyldecyl, 2-octyldecyl, n-undecyl, n-dodecyl, 2-ethyldodecyl, 2-butyldodecyl, 2-hexyldodecyl, 2-octyldodecyl, n-tridecyl, n-tetradecyl, n-pentadecyl, n-hexadecyl, 2-ethylhexadecyl, 2-butylhexadecyl, 2-hexylhexadecyl, 2-octylhexadecyl, n-heptadecyl, n-octadecyl, n-nonadecyl, n-eicosyl, 2-ethyl eicosyl, 2-butyl eicosyl, 2-hexyl eicosyl, 2-octyl eicosyl, n-henicosyl, n-docosyl, n-tricosyl, n-tetracosyl, n-pentacosyl, n-hexacosyl, n-heptacosyl, n-octacosyl, n-nonacosyl, and n-triacontyl.

In the present disclosure, —* may refer to a bonding site.

The first diamine compound represented by Formula 1 may be represented by the following Formula 1-1:

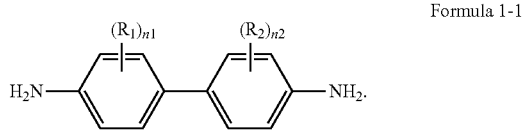

Formula 1-1

In Formula 1-1, $R_1$, $R_2$, n and $n_2$ may be defined as in Formula 1.

In some embodiments, the first diamine compound of Formula 1-1 may be a biphenyl compound in which the two amine groups (*—$NH_2$) are bonded at the para position thereof. For example, the first diamine compound according to an embodiment may be a benzidine compound.

In Formula 1-1, $n_1$ and $n_2$ may be each independently an integer of 1 or more, and $R_1$ and $R_2$ may be each independently an alkyl group of 1 to 20 carbon atoms substituted with at least one fluorine atom. For example, in Formula 1-1, both $n_1$ and $n_2$ may be 1, and both $R_1$ and $R_2$ may be trifluoromethyl.

In some embodiments, the first diamine compound represented by Formula 1 may be represented by the following Formula 1-2:

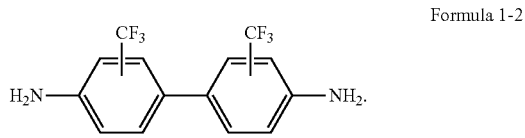

Formula 1-2

In some embodiments, the first diamine compound may be a diamine compound represented by the following Formula 1-3:

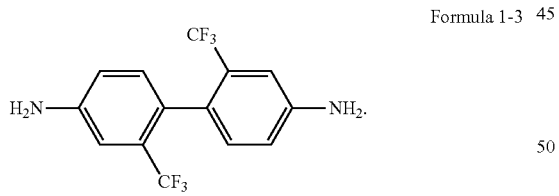

Formula 1-3

In an embodiment, the first diamine compound may be 2,2'-bis(trifluoromethyl)benzidine (TFMB).

The polyamic acid according to embodiments of the present disclosure may be a polymer formed by the polymerization reaction of at least two kinds (types) of diamine compounds and at least one dianhydride compound. For example, one diamine compound may be the first diamine compound represented by Formula 1 and at least one other diamine compound may be different from the first diamine compound. For example, the polyamic acid according to embodiments of the present disclosure may be formed by the polymerization reaction of two kinds (types) of diamine compounds including the first diamine compound of the present embodiments and further including a second diamine compound, which is different from the first diamine compound, with at least one dianhydride compound.

In some embodiments, the second diamine compound may be represented by the following Formula 2:

Formula 2

In Formula 2, Ar may be a substituted or unsubstituted phenyl, and m may be an integer of 1 to 4. In the second diamine compound represented by Formula 2, Ar may be phenyl, or phenyl substituted with phenyl. For example, Ar may be phenyl or biphenyl.

In an embodiment, the second diamine compound may have at least one carboxyl group.

In the polyamic acid of the present embodiments, the second diamine compound represented by Formula 2 may inhibit intermolecular interaction during a thermal imidization process via heat treatment, and increase the distance between chains, thereby restraining the formation of a charge transfer complex. In addition, the second diamine compound may play the role of a cross linker in the polymerization reaction. For example, the second diamine compound may play the role of a cross linking agent for connecting polyamic acid units that are formed by the polymerization reaction, may increase the formation of a polyamic acid network, and may improve the mechanical properties and increase the heat resistance of the resulting polyimide film.

The second diamine compound represented by Formula 2 may be represented by the following Formula 2-1:

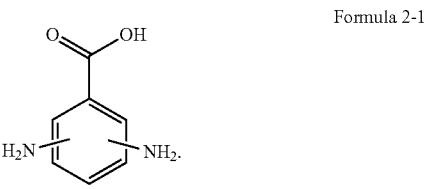

Formula 2-1

In the second diamine compound represented by Formula 2-1, two amine groups (*—$NH_2$) may be bonded ortho or meta to the phenyl group. For example, the second diamine compound may be 3,5-diaminobenzoic acid, 3,4-diaminobenzoic acid, 2,3-diaminobenzoic acid, or 2,6-diaminobenzoic acid. However, an embodiment of the inventive concept is not limited thereto.

In some embodiments, the second diamine compound may be represented by the following Formula 2-2:

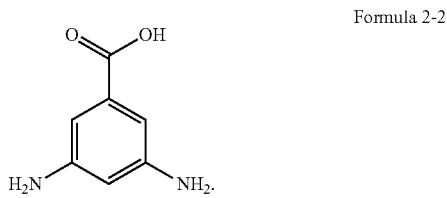 [SMILES: Nc1cc(N)cc(C(=O)O)c1]

Formula 2-2

The dianhydride compound for forming the polyamic acid according to an embodiment of the present disclosure may include at least one selected from 4,4'-(hexafluoroisopropylidene)diphthalic anhydride (6FDA), 3,3',4,4'-biphenyltetracarboxylic dianhydride (BPDA), cyclobutane-1,2,3,4-tetracarboxylic dianhydride (CBDA), and pyromellitic dianhydride (PMDA). In an embodiment, the dianhydride compound may be one selected from 6FDA, BPDA, CBDA, and PMDA, or may include at least two selected therefrom.

The polyamic acid of an embodiment may be a polymer product prepared by the polymerization reaction of at least one dianhydride compound selected from 6FDA, BPDA, CBDA, and PMDA, the first diamine compound represented by Formula 1, and the second diamine compound represented by Formula 2. For example, the polyamic acid of an embodiment may be a polymerization product of 3,3',4,4'-biphenyltetracarboxylic dianhydride, 2,2'-bis(trifluoromethyl)benzidine (TFMB), and 3,5-diaminobenzoic acid (DABA).

The polyamic acid of an embodiment may be formed by the reaction of the dianhydride compound with the first diamine compound and the second diamine compound, where the first and second diamine compounds are in a molar ratio of about 1:0.9 to about 1:1.1. For example, at least two kinds (types) of the diamine compounds including the first diamine compound and the second diamine compound may be included in a molar ratio of about 0.9 to about 1.1, based on 1 mole of the dianhydride compound. For example, the dianhydride compound may react with at least two kinds (types) of the diamine compounds including the first diamine compound and the second diamine compound in a molar ratio of about 1:1 to produce the polyamic acid of an embodiment of the present disclosure.

In an embodiment, the first diamine compound and the second diamine compound may be included in a molar ratio of about 0.01:0.99 to about 0.99:0.01. For example, the first diamine compound and the second diamine compound may be included in a molar ratio of about 0.5:0.5 to about 0.9:0.1. For example, the first diamine compound and the second diamine compound may be included in a molar ratio of about 0.6:0.4 to about 0.8:0.2. In this case, all of the first diamine compound and the second diamine compound may react with the dianhydride compound in a molar ratio of about 1:0.9 to about 1:1.1.

In an embodiment, the first diamine compound and the second diamine compound may be included in a molar ratio of about 0.75:0.25. In this case, all of the first diamine compound and the second diamine compound may react with the dianhydride compound in a molar ratio of about 1:0.9 to 1:1.1.

The polyamic acid of an embodiment may include a polyamic acid unit represented by the following Formula 3:

which may include the polyamic acid unit represented by Formula 3, may be from about 10,000 to about 1,000,000.

The polyamic acid of an embodiment is a polymer that may be obtained by simultaneously reacting a dianhydride compound and at least two different kinds (types) of diamine compounds that include the first diamine compound represented by Formula 1 and the second diamine compound, which is different from the first diamine compound. Accordingly, a polyimide precursor for preparing polyimide having good heat resistance, and excellent optical properties, including high transparency and low yellow index, may be obtained.

The polyamic acid of an embodiment may be obtained by polymerizing the dianhydride compound, the first diamine compound represented by Formula 1, and the second diamine compound represented by Formula 2, and from the resulting polyamic acid, a polyimide film exhibiting good heat resistance and optical properties may be fabricated.

The polyimide film of an embodiment may include a repeating unit derived from the polyamic acid of an embodiment. For example, the polyimide film of an embodiment may be fabricated to include a repeating unit obtained by the imidization of the polyamic acid of an embodiment.

The polyimide film of an embodiment may be formed from a polyamic acid, which in turn may be obtained by the polymerization reaction of the dianhydride compound with at least two kinds (types) of diamine compounds including the first diamine compound represented by Formula 1. For example, the polyimide film of an embodiment may be fabricated by including the repeating unit derived from the polyamic acid, where the polyamic acid may be a polymerization product of the dianhydride compound, the first diamine compound represented by Formula 1, and the second diamine compound represented by Formula 2.

Hereinafter, a fabrication method of a polyimide film of an embodiment of the present disclosure will be explained by referring to attached drawings.

Each of FIGS. 1 and 2 is a flowchart showing tasks of a fabrication method of a polyimide film according to one or more embodiments of the present disclosure. Referring to FIG. 1, the fabrication method of a polyimide film of an embodiment may include a task of preparing a polyamic acid by a polymerization reaction of a dianhydride compound with at least two kinds (types) of diamine compounds (S100), a task of supplying the polyamic acid on a substrate to form a polyamic acid layer (S200), and a task of heat treating the polyamic acid layer (S300).

In the task of preparing a polyamic acid by the polymerization reaction of a dianhydride compound and at least two kinds (types) of diamine compounds (S100), the polyamic Formula 3

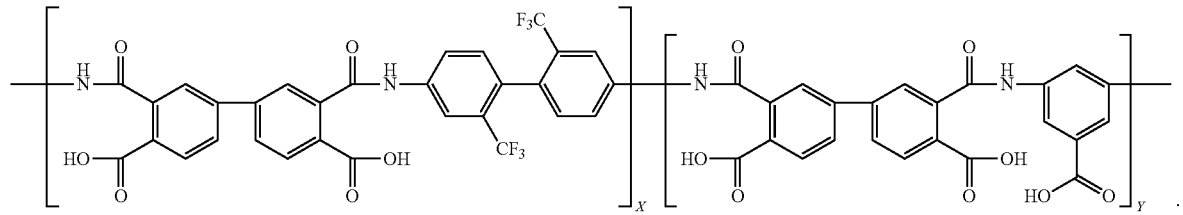

In Formula 3, X and Y may be each independently an integer of 1 or more. The number average molecular weight (Mn) of the polyamic acid according to an embodiment, acid of the present embodiments may be prepared. The polyamic acid thus prepared may be a polyamic acid copolymer obtained by the polymerization reaction of the dianhydride compound and at least two kinds (types) of diamine compounds. In the task of preparing the polyamic acid (S100), the dianhydride compound, the first diamine compound represented by Formula 1 and the second diamine compound, which is different from the first diamine compound, may be added to an organic solvent, and a polymerization reaction may be performed in the organic solvent to produce the polyamic acid.

In the task of preparing a polyamic acid (S100), the organic solvent may be N,N-dimethyl acetamide (DMAc), dimethylformamide (DMF), N-methyl-2-pyrrolidone (NMP), m-cresol, tetrahydrofuran (THF), chloroform, or a mixture solvent thereof. For example, the organic solvent may be N,N-dimethylacetamide (DMAc), N-methyl-2-pyrrolidone (NMP), or a mixture solvent of the two solvents. However, the organic solvent used in the task of preparing a polyamic acid (S100) is not limited to the suggested organic solvents, and any organic solvent capable of dissolving the dianhydride compound and the diamine compound may be used, without limitation.

In the task of preparing a polyamic acid (S100), a dianhydride compound and at least two kinds (types) of diamine compounds may be included in a molar ratio of about 1:0.9 to about 1:1.1 and may be mixed with the organic solvent to perform a polymerization reaction. The at least two kinds (types) of diamine compounds may include a first diamine compound represented by Formula 1 and a second diamine compound represented by Formula 2. The first diamine compound and the second diamine compound may be mixed in a molar ratio of about 0.01:0.99 to about 0.99:0.01 and polymerized. For example, the first diamine compound and the second diamine compound may be mixed in a molar ratio of about 0.5:0.5 to about 0.9:0.1 and polymerized. For example, the dianhydride compound and at least two kinds (types) of diamine compounds may be mixed in a molar ratio of about 1:1, and among the at least two kinds (types) of diamine compounds, the first diamine compound and the second diamine compound may be mixed in a molar ratio of about 0.5:0.5 to about 0.9:0.1, to prepare the polyamic acid via an imidization reaction.

The task of preparing a polyamic acid (S100) may include a task of preparing a diamine compound solution by first dissolving at least two kinds (types) of diamine compounds in an organic solvent. Here, the diamine compound solution may be without a dianhydride compound. The task of preparing a polyamic acid (S100) may further include a task of preparing a dianhydride compound solution by dissolving a dianhydride solution in an organic solvent, separately from the diamine compound solution.

For example, in the task of fabricating a polyimide film of an embodiment, at least two kinds (types) of diamine compounds may be first mixed in the organic solvent in a suitable molar ratio to prepare the diamine compound solution, and then, the dianhydride compound may be separately dissolved in the organic solvent to prepare the dianhydride compound solution. Then, the diamine compound solution and the dianhydride compound solution may be mixed in a molar ratio of the diamine compound to the dianhydride compound of about 1:0.9 to about 1:1.1, to perform a polymerization reaction and to prepare a polyamic acid.

In an alternative embodiment, a dianhydride compound, a first diamine compound and a second diamine compound may be mixed in a suitable molar ratio in one task and may be polymerized to prepare a polyamic acid.

The task of preparing a polyamic acid (S100) may be performed in an inert gas atmosphere. For example, the task of preparing a polyamic acid (S100) may be performed in a nitrogen gas atmosphere.

The task of preparing a polyamic acid (S100) may be performed in a temperature range of about −10° C. to about 80° C. In an embodiment, the task of preparing a polyamic acid (S100) may be performed in a temperature range of about −10° C. to about 80° C. for about 10 minutes to about 24 hours.

The polyamic acid prepared by the polymerization reaction of the present embodiments may be included in an organic solvent in an amount of about 5 wt % to about 80 wt %. For example, the polyamic acid thus prepared may be included in the organic solvent in an amount of about 10 wt % to about 50 wt % by the solid content.

For example, the polyamic acid prepared by the polymerization reaction may have a repeating unit represented by the following Formula 3:

Formula 3

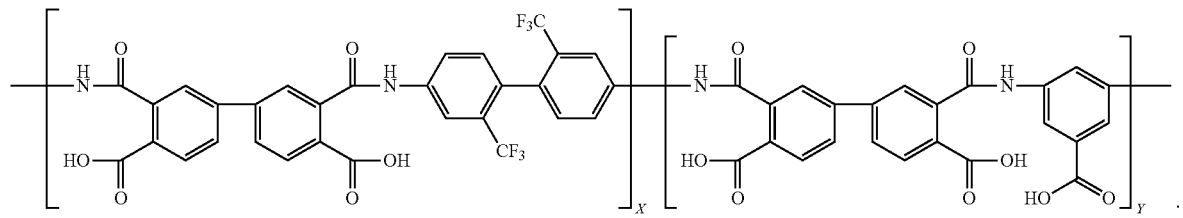

In Formula 3, X and Y may be each independently an integer of 1 or more. The number average molecular weight (Mn) of the polyamic acid according to an embodiment, which may include a polyamic acid unit represented by Formula 3, may be from about 10,000 to about 1,000,000.

The fabrication method of a polyimide film of an embodiment may include a task of providing (e.g., supplying) a polyamic acid on a substrate to form a polyamic acid layer (S200), following the task of preparing a polyamic acid (S100), as shown in FIG. 1.

The polyamic acid prepared according to the method of the present embodiments may be provided on a substrate as a support for forming a film. However, a coating method for providing the polyamic acid thus prepared on the substrate is not limited thereto, and any suitable method for uniformly (or substantially uniformly) providing the polyamic acid on the substrate to form a film layer may be used, without limitation. For example, the polyamic acid thus prepared may be provided on the substrate by a coating method.

The substrate on which the polyamic acid is supplied may be any suitable substrate for providing a support for fabrication of a polyimide film, without limitation. For example, the substrate may be a glass substrate, a substrate formed of a metal material, or a substrate formed of a polymer material, and the surface of the substrate may be substantially smooth, for uniformly (or substantially uniformly) coating the polyamic acid.

The polyamic acid provided on the substrate may include an organic solvent. After providing the polyamic acid on the substrate, a task of drying the organic solvent may be performed. The task of drying the polyamic acid provided on the substrate may be performed at a temperature of about 30° C. to about 140° C. for about 10 to about 180 minutes. For example, the task of drying the organic solvent after coating the polyamic acid may be performed at a temperature of about 40° C. to about 80° C. for about 30 to about 120 minutes.

The polyamic acid layer formed after drying may be a coated layer having a thickness of about 5 μm to about 150 μm. For example, the polyamic acid layer formed after drying may be a coated layer having a thickness of about 10 μm to about 100 μm.

After the task of forming a polyamic acid layer by providing the polyamic acid on the substrate (S200), a task of heat treating the polyamic acid layer (S300) may be performed. The task of heat treating the polyamic acid layer (S300) may be a task of forming a polyimide layer by applying heat to the polyamic acid for the reaction by a thermal imidization method.

The task of heat treating the polyamic acid layer (S300) may include a heat treating task performed at a temperature of about 250° C. to about 550° C. For example, the task of heat treating the polyamic acid layer (S300) may be performed at a temperature of about 300° C. to about 500° C.

In the case where the heat treating is performed at about 250° C. or more, the imidization degree of the resulting polyamic acid may be increased and the hysteresis of the polyimide thus formed may be improved when compared with a case where the heat treating of the polyamic acid is performed at less than about 250° C. In the case where the task of heat treating the polyamic acid layer (S300) is performed at greater than about 500° C., thermal decomposition phenomenon of the polyamic acid layer may be generated, and the yellow index may be increased in a film formed by the imidization of the polyamic acid according to the present embodiments.

In an embodiment, the task of heat treating a polyamic acid layer (S300) may be performed at high temperature conditions, for example, at a temperature of about 250° C. to about 550° C., for about 5 to about 180 minutes. For example, the task of heat treating a polyamic acid layer (S300) may be performed for about 5 to about 120 minutes, for example, for about 30 to about 120 minutes. In the case where the heat treating time is less than about 5 minutes, the imidization of the polyamic acid layer may be insufficiently performed, and in the case where the heat treating time is longer than about 180 minutes, the polyamic acid layer and the film formed by the imidization of the polyamic acid layer may be thermally decomposed, and thus the mechanical properties of the resulting polyimide film may be deteriorated, and the yellow index thereof may be increased.

For example, the task of heat treating a polyamic acid layer (S300) may be performed at about 300° C. for about 30 to about 120 minutes. However, an embodiment of the inventive concept is not limited thereto. In the case where the heat treating temperature is greater than about 300° C. during the heat treating task of a polyamic acid layer (S300), the heat treating time may decrease to about 30 minutes.

In the fabrication method of a polyimide film of an embodiment, by performing the task of heat treating a polyamic acid layer (S300) at high temperature conditions of about 250° C. to about 550° C., the imidization degree of the polyamic acid may be increased, the glass transition temperature ($T_g$) and thermal decomposition temperature ($T_d$) of the resulting polyimide film may be increased to improve heat resistance, and a thermal expansion coefficient (CTE) may be decreased to increase dimensional stability. In addition, by performing the task of heat treating a polyamic acid layer (S300) at high temperature conditions of about 250° C. to about 550° C., the yellow index of the polyimide film thus fabricated may be decreased to improve optical properties.

In an embodiment, the task of heat treating a polyamic acid layer (S300) may be performed in a vacuum state. For example, the task of heat treating a polyamic acid layer (S300) may be performed at temperature conditions of about 250° C. to about 550° C. and in a vacuum state. For example, the vacuum state may be a quasi-vacuum state.

The task of heat treating a polyamic acid layer (S300) may be performed in isothermal conditions within a certain temperature range. Alternatively, the task of heat treating a polyamic acid layer (S300) may be performed by a plurality of heat treating tasks, where the heat treating tasks are performed in a plurality of temperature conditions, respectively, in a temperature range of about 250° C. to about 550° C.

In the fabrication method of a polyimide film of an embodiment as shown in FIG. 1, a task of cooling a heat treated polyamic acid layer (see e.g., S400, FIG. 2) is not illustrated. However, in the fabrication method of a polyimide film of an embodiment, the task of cooling a heat treated polyamic acid layer may be further included after the task of heat treating a polyamic acid layer (S300).

The polyimide film of an embodiment fabricated on a substrate may be used as a supporting substrate of a display apparatus, after the initial substrate acting as a support is removed, or as a transparent substrate of an electronic information material. In an embodiment, the polyimide film and the substrate on which the polyimide film is provided may be used together as the supporting substrate of a display apparatus.

FIG. 2 is a flowchart schematically illustrating a fabrication method of a polyimide film according to an embodiment of the present disclosure and is different from the fabrication method of a polyimide film shown in FIG. 1 in the task of heat treating a polyamic acid layer.

In the fabrication method of a polyimide film according to an embodiment as shown in FIG. 2, a task of heat treating the polyamic acid layer at a first temperature (S310) and a task of heat treating the polyamic acid layer at a second temperature (S320) may be sequentially included after the task of forming a polyamic acid layer (S200) by supplying the polyamic acid on a substrate.

In the fabrication method of a polyimide film according to an embodiment as shown in FIG. 2, descriptions of a task of preparing a polyamic acid by a polymerization reaction of a dianhydride compound with at least two kinds (types) of diamine compounds (S100) and a task of forming a polyamic acid layer by supplying the polyamic acid on a substrate (S200) may be the same as those provided in connection with the fabrication method of a polyimide film according to an embodiment shown in FIG. 1.

In the fabrication method of a polyimide film according to an embodiment as shown in FIG. 2, the task of heat treating the polyamic acid layer at the first temperature (S310) may be a first heat treating task, the task of heat treating the polyamic acid layer at a second temperature (S320) may be a second heat treating task, following the first heat treating task, and the second temperature may be higher than the first temperature. For example, the first temperature may be from about 250° C. to less than about 300° C., and the second temperature may be from about 300° C. to about 550° C.

Referring to the fabrication method of a polyimide film according to an embodiment as shown in FIG. 2, the task of heat treating, at a high temperature, the polyamic acid layer formed on the substrate may be performed in two or more tasks. For example, the task of heat treating the polyamic acid layer may include at least two heat treating tasks with different temperature conditions for heat treating. The fabrication method of a polyimide film according to an embodiment may be performed by at least two heat treating tasks of the polyamic acid layer, so as to improve the imidization degree of the polyamic acid and the mechanical properties of the polyimide film. Accordingly, a polyimide film having good heat resistance and optical properties may be obtained.

In FIG. 2, the task of cooling the heat treated polyamic acid layer (S400) may be a task of cooling an imidized film to room temperature, after heat treating the film at a high temperature. In an embodiment, the task of cooling the heat treated polyamic acid layer (S400) may be a task of cooling an imidized film to a temperature below room temperature, after heat treating the film at a high temperature.

In the fabrication method of a polyimide film according to an embodiment, the arrangement of polyimide polymer chains forming the polyimide film may be controlled by controlling the cooling rate in the task of cooling the polyamic acid layer (S400), and thus the heat resistance and optical properties of the resulting polyimide film may be improved. For example, by performing the task of cooling the heat treated polyamic acid layer (S400) in a chamber so as to slowly cool the heat treated polyamic acid layer, the packing degree of polymer chains may be increased, and a polyimide film having improved mechanical properties and heat resistance may be fabricated.

The polyamic acid used in the fabrication method of a polyimide film according to an embodiment of FIGS. 1 and 2 may be the polyamic acid of the present embodiments. In the polyamic acid prepared by the polymerization reaction of a dianhydride compound and at least two diamine compounds, the dianhydride compound may include at least one selected from 4,4'-(hexafluoroisopropylidene)diphthalic anhydride (6FDA), 3,3',4,4'-biphenyltetracarboxylic dianhydride (BPDA), cyclobutane-1,2,3,4-tetracarboxylic dianhydride (CBDA) and pyromellitic dianhydride (PMDA).

In some embodiments, the at least two kinds (types) of diamine compounds may include the first diamine compound represented by Formula 1, and the second diamine compound represented by Formula 2:

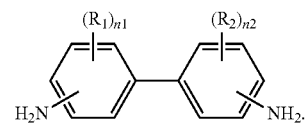

Formula 1

In Formula 1, $R_1$ and $R_2$ may be each independently a hydrogen atom, a deuterium atom, a halogen atom, or a substituted or unsubstituted alkyl group of 1 to 20 carbon atoms. In addition, $n_1$ and $n_2$ may be each independently an integer of 0 to 4.

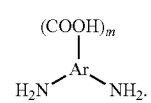

Formula 2

In Formula 2, Ar may be a substituted or unsubstituted phenyl group, and m may be an integer of 1 to 4.

Description of the dianhydride compound, the first diamine compound, the second diamine compound and the polyamic acid produced by the polymerization reaction of the compounds, may be the same as the description of the polyamic acid of the above-described embodiment. The polyamic acid of the present embodiment may correspond to the polyamic acid prepared by the polymerization reaction of the dianhydride compound and at least two kinds (types) of diamine compounds in the fabrication method of a polyimide film described with reference to FIGS. 1 and 2.

The polyimide film fabricated by the fabrication method of the present embodiment may simultaneously (or concurrently) have excellent optical properties and heat resistance.

The polyimide film of the present embodiment may be fabricated by the fabrication method of the polyimide film of the above-described embodiment. The polyimide film of the present embodiment may include a repeating unit derived from the polyamic acid of the present embodiment.

For example, the repeating unit of the polyimide derived from the polyamic acid may be represented by the following Formula 4:

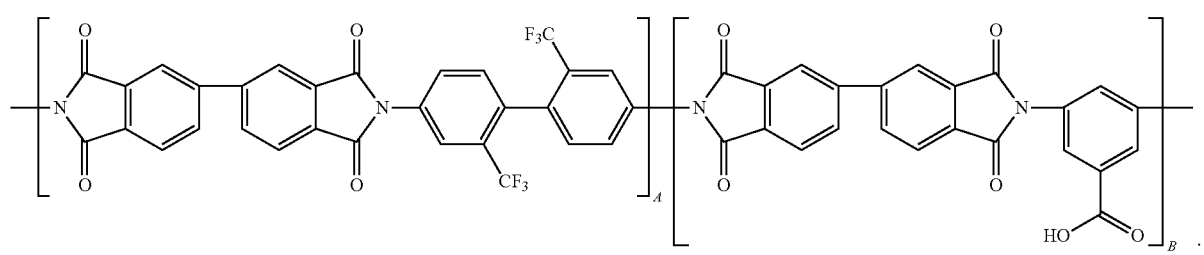

Formula 4

In Formula 4, A and B may each independently be an integer of 1 or more. The number average molecular weight (Mn) of the polyimide according to an embodiment, which may include the polyimide repeating unit represented by Formula 4, may be from about 10,000 to about 1,000,000.

The polyimide film of an embodiment may have a thermal expansion coefficient of about 10 ppm/° C. to about 20 ppm/° C. The polyimide film may have a thermal expansion coefficient of about 10 ppm/° C. to about 20 ppm/° C., while maintaining dimensional stability even at high temperature conditions.

In addition, the glass transition temperature of the polyimide film of an embodiment may be from about 300° C. to about 420° C. Meanwhile, the thermal decomposition temperature of the polyimide film of an embodiment may be from about 400° C. to about 500° C. In this case, the thermal decomposition temperature may refer to the temperature at a point when the weight reduction ratio of the polyimide film reaches about 1%. For example, the thermal decomposition temperature may refer to the temperature at the moment when the weight of the polyimide film after heating reduces to 1% based on the weight of an initial polyimide film before heating.

The polyimide film of an embodiment may have a high glass transition temperature of about 300° C. to about 420° C. and a high thermal decomposition temperature of about 400° C. to about 500° C., and thus may have high stability and reliability at high temperature conditions.

Light transmittance of the polyimide film of an embodiment may be about 95% or more, and the yellow index thereof may be from 1 to 10. In this case, the light transmittance of the polyimide film may refer to the light transmittance in a visible light region. In the present disclosure, the light transmittance may refer to a relative transmittance, when the transmittance of a glass substrate is set to about 100%. That is, the light transmittance of the polyimide film may refer to a relative transmittance based on the transmittance of a glass substrate.

The light transmittance of the polyimide film of an embodiment may represent light transmittance at about 550 nm. For example, the polyimide film of an embodiment may have a high light transmittance of about 95% or more and a low yellow index of about 1 to about 10, and may be used as an optical film requiring transparency or a substrate of a display apparatus.

The polyimide film of an embodiment may simultaneously (or concurrently) have a light transmittance of about 95% or more, and a thermal expansion coefficient of about 10 ppm/° C. to about 20 ppm/° C. For example, the polyimide film of an embodiment may simultaneously (or concurrently) have a light transmittance of about 95% or more, a thermal expansion coefficient of about 10 ppm/° C. to about 20 ppm/° C., and a glass transition temperature of about 300° C. to about 420° C.

In an embodiment, the polyimide film may simultaneously (or concurrently) have a light transmittance of about 95% or more, a yellow index of about 1 to about 10, and a glass transition temperature of about 300° C. to about 420° C.

The polyimide film of an embodiment may be fabricated from the polyamic acid of an embodiment, which in turn may represent a polymerization reaction product of a dianhydride compound and at least two kinds (types) of diamine compounds, and the polyimide film may have high heat resistance and excellent optical properties.

The polyimide film of an embodiment may have a high light transmittance and a low yellow index, and in addition, a high glass transition temperature and a high thermal decomposition temperature, and may be used as a substrate of a display apparatus requiring excellent optical properties, heat resistance and mechanical strength. In addition, the polyimide film of an embodiment is a polymer film having dimensional stability and excellent mechanical properties, and may be used as a supporting substrate of a flexible display apparatus, etc.

The polyimide film of an embodiment may be fabricated using a polyamic acid prepared by polymerizing a dianhydride compound and the combination of at least two diamine compounds, and the polyimide film may have high heat resistance and good optical properties. Accordingly, the polyimide film may be used as a material for a transparent substrate of a display apparatus requiring a manufacturing process at a high temperature.

Hereinafter, a polyamic acid according to an embodiment, and a polyimide film of an embodiment, fabricated by a fabrication method of a polyimide film of an embodiment will be explained with reference to example embodiments and comparative embodiments. The following embodiments are provided only for illustration and to assist the understanding of the inventive concept, however, and the scope of the inventive concept is not limited thereto.

EXAMPLES

1. Preparation of Polyamic Acid

A polyamic acid of an embodiment was prepared by a condensation polymerization method in a solution phase using a dianhydride compound, and two kinds (types) of diamine compounds including a first diamine compound and a second diamine compound, while maintaining a molar ratio of about 1:1, through the following tasks.

In this case, the dianhydride compound was 3,3',4,4'-biphenyltetracarboxyl dianhydride (BPDA), the first diamine compound was 2,2'-bis(trifluoromethyl)benzidine (TFMB), and the second diamine compound was 3,5-diaminobenzoic acid (DABA).

The mixing molar ratios of the dianhydride compound, the first diamine compound, and the second diamine compound used in embodiments are listed in Table 1 below. In the following Examples, the diamine compound, including the first diamine compound and the second diamine compound, and the dianhydride were mixed in a molar ratio of about 1:1 (diamine compound:dianhydride), while a molar ratio of the first diamine compound to the second diamine compound was varied from about 0.5:0.5 to about 0.9:0.1.

TABLE 1

| | Diamine compound (mole %) | | |
|---|---|---|---|
| Example | First diamine compound | Second diamine compound | Dianhydride compound (mole %) |
| 1 | 90 | 10 | 100 |
| 2 | 80 | 20 | 100 |
| 3 | 75 | 25 | 100 |
| 4 | 65 | 35 | 100 |
| 5 | 50 | 50 | 100 |

First, nitrogen (99.99%) was injected into a flask at a rate of about 100 ml/min for about 10 minutes to fill the interior of the flask with nitrogen. Then, a nitrogen injector including a 0.2 μm separator membrane filter was installed in the flask, and nitrogen was injected at a rate of about 20 ml/min, so that the interior of the flask maintained a nitrogen-charged state during the polymerization reaction of a polyamic acid.

N,N-dimethyl acetamide (DMAc, Duksan Pure Chemicals Co., Ltd., Korea) with purity of about 95% was injected into the flask as an organic solvent, and a first diamine compound and a second diamine compound were mixed in a molar ratio shown in Table 1 with the organic solvent to prepare a diamine compound solution with a concentration of 2 m (molality, molal concentration). Then, the solution thus prepared was left at room temperature (about 25° C.) for about 5 to about 20 minutes under a nitrogen atmosphere to completely dissolve the diamine compounds to prepare a diamine compound solution.

In addition, DMAc was injected into a separate flask, and 3,3',4,4'-biphenyltetracaroxylic acid dianhydride (BPDA) was injected thereto to prepare a solution of 2 m concentration. Then, the solution thus prepared was left at room temperature (about 25° C.) for about 5 to about 20 minutes under a nitrogen atmosphere to completely dissolve the dianhydride compound to prepare a dianhydride compound solution.

After that, the dianhydride compound solution was added to the flask including the diamine compound solution, and DMAc was added thereto, so that a polyamic acid solid content was about 20 wt %, followed by mixing the resulting product at a temperature range of room temperature (about 25° C.) to a low temperature (about −10° C.) under a nitrogen atmosphere for about 22 hours at a speed of about 60 rpm to about 100 rpm, to prepare a polyamic acid polymer solution via a polymerization reaction. The resulting polyamic acid polymer solution included about 20 wt % of the polyamic acid polymer in a solid content, and synthesis conditions were controlled to obtain the viscosity of a solution of about 5000±300 cps.

2. Fabrication of Polyimide Film

The polyamic acid prepared by the above-described method was applied to a glass substrate. In this case, the glass substrate included soda-lime glass (MATSUNAMI (Japan)) and/or borosilicate glass (MATSUNAMI (Japan)). In order to remove foreign substances and/or impurities from the glass substrate, the glass substrate was cleaned in acetone for about 10 minutes using an ultrasonicator and then in isopropyl alcohol (IPA) for about 10 minutes. Then, the resulting glass substrate was sufficiently and repeatedly cleaned in de-ionized water with 17 MΩ or more for about 30 minutes, and dried in a convection-type drying oven at about 120° C. for about 60 minutes.

On the glass substrate thus cleansed and dried, the polyamic acid solution prepared by the above-described method was coated, and a thin film was formed using a spin-coater or a slit-die coater. The coated layer of the polyamic acid solution was pre-dried using a hot plate at about 50° C. for about 60 minutes, and then additionally dried at about 70° C. for about 120 minutes to remove organic solvents and to form a polyamic acid layer. After drying the organic solvents, the thickness of the polyamic acid layer was measured using a surface profiler (Dektak 150, Veeco Instruments, Inc., USA), and the thickness of the polyamic acid layer thus measured was about 18±2 μm.

The glass substrate on which the polyamic acid layer was formed was injected into a self-designed reactor, and the polyamic acid layer was heat treated. In this case, the self-designed reactor was kept in a vacuum state.

The heat treating of the polyamic acid layer was conducted in two tasks. In the first heat treating task, the temperature of the reactor was elevated at a rate of about 4° C. per minute to about 270° C., and then an isothermal state was maintained at about 270° C. for about 120 minutes. After that, the temperature was elevated at a rate of 5° C. per minute to a final temperature of about 400° C., and an isothermal state was maintained at about 400° C. for about 60 minutes to conduct the second heat treating task.

By conducting the above-described heat treating tasks, the polyamic acid layer was thermally imidized to fabricate a polyimide film.

3. Evaluation of Properties of the Polyimide Film

The optical properties and heat resistance of the polyimide film fabricated by the above-described method were evaluated, and the results are shown in Table 2. The evaluation results were compared to those obtained in comparative embodiments. In comparative embodiments, polyimide films were fabricated by the same method as the one described above, except for using only one kind (type) of a diamine compound.

In Comparative Example 1, only 2,2'-bis(trifluoromethyl) benzidine (TFMB) was used as the diamine compound, and in Comparative Example 2, only 3,5-diaminobenzoic acid (DABA) was used as the diamine compound.

In order to evaluate optical properties, light transmittance (total transmittance) was measured at a wavelength of about 550 nm and yellow index (Y.I.) was measured by an ASTM D1925 method using a measurement apparatus of chromaticity and brightness (Array spectrometer MCPD-3000, Otsuka Electronics, JAPAN). The light transmittance was evaluated as relative transmittance on the basis of the transmittance of a glass substrate. That is, the light transmittance in Table 2 represents a relative transmittance of a polyimide film obtained when the transmittance of the glass substrate was set to 100%.

In order to evaluate heat resistance, a glass transition temperature ($T_g$) and a thermal expansion coefficient (CTE) were measured using Thermomechanical Analyzer (TMA Q400 TA Instruments). A sample was taken by cutting a polyimide film fabricated by the above-described method into a size of 2 mm×16 mm, and fixed with a load of about 0.03 N under a nitrogen environment to stabilize, and the length change of the sample polyimide film was measured. A thermal expansion coefficient was evaluated by measuring the expansion degree of the sample polyimide film in a length direction on a plane. In order to minimize (reduce) the influence of external factors such as humidity and dusts, the sample polyimide film was heated at a rate of about 10° C./min to about 150° C., cooled naturally to about 40° C., and heated again at a rate of about 10° C./min to about 500° C., before obtaining final measurements. The thermal expansion coefficient was measured in a temperature range of about 50° C. to about 250° C.

A thermal decomposition temperature ($T_d$) was measured by measuring weight reduction according to the temperature, using Thermogravimetric Analyzer (TGA Q600 TA Instruments). The weight of a specimen was 4 mg (±0.2 mg). The thermal decomposition temperature was measured by the same method as the one used for measuring the thermal expansion coefficient (using TMA under nitrogen environment by a two-task heat treatment and by taking final measurements). First, in the first heat treating task, the temperature of the specimen was elevated at a rate of about 20° C. per minute to about 250° C., and then naturally cooled to about 150° C., and in the second heat treating task, the temperature was elevated at the same rate to about 700° C. Thermal stability was evaluated by measuring the thermal decomposition temperature, which refers to a temperature at which the weight of the specimen is decreased due to thermal decomposition. In Table 2, $T_{d,\ 1\%}$ refers to a temperature at which the weight of the specimen was decreased by about 1% due to thermal decomposition, and $T_{d,\ 0.5\%}$ refers to a temperature at which the weight of the specimen was decreased by about 0.5% due to thermal decomposition. In this case, a weight of about 100% was based on the weight at about 200° C. after the first heat treating.

TABLE 2

|  |  | Transmittance (%) | Y.I. | $T_{d,\ 1\%}$ (°C.) | $T_{d,\ 0.5\%}$ (°C.) | CTE (ppm/°C.) | $T_g$ (°C.) |
|---|---|---|---|---|---|---|---|
| Example | 1 | 96.8 | 5.9 | 469 | 438 | 14.7 | 322 |
|  | 2 | 96.7 | 5.9 | 457 | 430 | 15.5 | 340 |
|  | 3 | 96.1 | 6.1 | 458 | 438 | 16.0 | 361 |
|  | 4 | 95.6 | 6.1 | 456 | 429 | 18.0 | 382 |
|  | 5 | 95.6 | 6.2 | 436 | 375 | 19.2 | 383 |
| Comparative Example | 1 | 87.4 | 30.6 | 491 | 425 | 19.5 | 318 |
|  | 2 | 92.0 | 9.3 | 429 | 391 | 31.5 | 400 |

Referring to the results shown in Table 2, it was found that the polyimide films of Examples 1 to 5 exhibited a high optical transmittance and a low yellow index when compared with the polyimide films of Comparative Examples 1 and 2. That is, the polyimide films fabricated in Examples 1 to 5 by including at least two kinds (types) of diamine compounds exhibited better optical properties when compared with the polyimide films fabricated in the Comparative Examples by including only one kind (type) of a diamine compound.

In addition, the polyimide films of Examples 1 to 5 exhibited a lower thermal expansion coefficient when compared with the polyimide films of Comparative Examples 1 and 2. That is, the polyimide films of the Examples formed by including at least two kinds (types) of diamine compounds may have a lower thermal expansion coefficient and higher dimensional stability when compared with the polyimide films of the Comparative Examples formed by including only one kind of a diamine compound.

Further referring to Table 2, it may be found that the polyimide films of Examples 1 to 5 exhibited a higher thermal decomposition temperature, $T_{d,\ 1\%}$, when compared with the polyimide film of Comparative Example 2. That is, the polyimide films of the Examples formed by including at least two kinds (types) of diamine compounds had improved heat resistance when compared with the polyimide film using only 3,5-diaminobenzoic acid (DABA) as the diamine compound.

In addition, it may be found that the polyimide films of Examples 1 to 5 had a remarkably improved optical transmittance and yellow index when compared with the polyimide film of Comparative Example 1. That is, the polyimide films of the Examples formed by including at least two kinds (types) of diamine compounds had significantly improved optical properties when compared with the polyimide film using only 2,2'-bis(trifluoromethyl)benzidine (TFMB) as the diamine compound.

The polyamic acid of an embodiment, and the polyimide film of an embodiment fabricated using the polyamic acid may have a high glass transition temperature, a high thermal decomposition temperature, and a low thermal expansion coefficient, and thus, a polyimide film with improved heat resistance may be attained. In addition, the polyamic acid of an embodiment, and the polyimide film of an embodiment fabricated using the polyamic acid may have excellent (or suitable) heat resistance properties, while maintaining a high optical transmittance and a low yellow index, and thus, a polyimide film having excellent (or suitable) optical properties may be attained.

The polyamic acid of the present embodiments may be polymerized using at least two different kinds (types) of diamine compounds, and may be used for the fabrication of a polyimide film having high heat resistance and excellent optical properties. In addition, according to the fabrication method of the present embodiments, the polyimide film of the present embodiments may be fabricated by using the polyamic acid (polymerized by using at least two different kinds (types) of diamine compounds), and by treating the polyamic acid thus prepared under high temperature heat treating conditions, to carry out an imidization reaction of the polyamic acid. The resulting polyimide film may have high heat resistance and excellent optical properties.

The polyamic acid according to an embodiment of the present disclosure may include two different kinds (types) of diamine compounds and may be utilized as a material for forming a polyimide film having excellent optical properties and high heat resistance.

The polyimide film according to an embodiment of the present disclosure may use the polyamic acid (formed by including two different kinds (types) of diamine compounds), and may have excellent optical properties and heat resistance.

The fabrication method of a polyimide film according to an embodiment of the present disclosure may use the polyamic acid (formed by including two different kinds (types) of diamine compounds) and by heat treating the polyamic acid at a high temperature, to provide a polyimide film having excellent optical properties and heat resistance.

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Although the example embodiments of the present invention have been described herein, it will be understood that the present invention should not be limited to these example embodiments, but various changes and modifications can be made by one of ordinary skill in the art within the spirit and scope of the present invention, as defined by the following claims and equivalents thereof.

The technical scope of the present inventive concept should therefore be determined not by the description in the specification but by the attached claims.

What is claimed is:

1. A polyimide film consisting of a solvent and a repeating unit derived from a polyamic acid,
    wherein the polyamic acid is a polymerization product of:
    a dianhydride compound comprising 3,3',4,4'-biphenyltetracarboxylic dianhydride as the only dianhydride;
    a first diamine compound comprising 2,2'-bis(trifluoromethyl)benzidine; and a second diamine compound represented by the following Formula 2 and different from the first diamine compound:

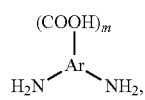

Formula 2 wherein in Formula 2, Ar is a substituted or unsubstituted phenyl group, and m is an integer of 1 to 4, wherein a light transmittance of the polyimide film is 95% or more, and a yellow index of the polyimide film is from 1 to 10, and wherein a molar ratio of the first diamine compound to the second diamine compound is from 0.90:0.10 to 0.75:0.25.

2. The polyimide film of claim 1, wherein a thermal expansion coefficient of the polyimide film is from 10 ppm/° C. to 20 ppm/° C.

3. The polyimide film of claim 1, wherein a glass transition temperature of the polyimide film is from 300° C. to 420° C.

4. The polyimide film of claim 1, wherein a thermal decomposition temperature of the polyimide film is from 400° C. to 500° C., wherein the thermal decomposition temperature is a temperature at which a weight reduction ratio of the polyimide film reaches 1%.

5. The polyimide film of claim 1, wherein the polyimide film has a light transmittance of 95% or more, a thermal expansion coefficient of 10 ppm/° C. to 20 ppm/° C., and a glass transition temperature of 300° C. to 420° C.

6. The polyimide film of claim 1, wherein the repeating unit is represented by the following Formula 4:

wherein in Formula 4, A and B are each independently an integer of 1 or more.

7. The polyimide film of claim 1, wherein the second diamine compound is 3,5-diaminobenzoic acid.

8. The polyimide film of claim 7, wherein a molar ratio of a sum of the first diamine compound and the second diamine compound with respect to the dianhydride compound is from 1:0.9 to 1:1.1.

9. The polyimide film of claim 7, wherein the molar ratio of a sum of the first diamine compound and the second diamine compound with respect to the dianhydride compound is 1:1.

10. The polyimide film of claim 8, wherein a thermal expansion coefficient of the polyimide film is from 10 ppm/° C. to 20 ppm/° C., wherein a glass transition temperature of the polyimide film is from 300° C. to 420° C., wherein a thermal decomposition temperature of the polyimide film is from 400° C. to 500° C., and wherein the thermal decomposition temperature is a temperature at which a weight reduction ratio of the polyimide film reaches 1%.

* * * * *

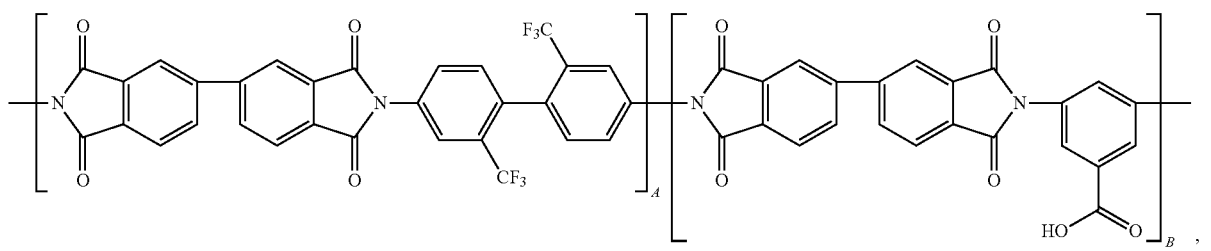

Formula 4